United States Patent
Manabe

(10) Patent No.: US 10,042,057 B2
(45) Date of Patent: Aug. 7, 2018

(54) INFORMATION PROCESSING DEVICE, TRAVELING DIRECTION ESTIMATION METHOD AND STORAGE MEDIUM

(71) Applicant: CASIO COMPUTER CO., LTD., Shibuya-ku, Tokyo (JP)

(72) Inventor: Yoshitsugu Manabe, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 15/151,107

(22) Filed: May 10, 2016

(65) Prior Publication Data
US 2016/0334514 A1    Nov. 17, 2016

(30) Foreign Application Priority Data

May 15, 2015   (JP) .................................. 2015-099756
Mar. 16, 2016  (JP) .................................. 2016-052366

(51) Int. Cl.
| G01S 19/45 | (2010.01) |
| G01C 5/06 | (2006.01) |
| G01P 13/02 | (2006.01) |
| G01S 19/39 | (2010.01) |
| G01C 21/16 | (2006.01) |

(52) U.S. Cl.
CPC .............. G01S 19/39 (2013.01); G01C 21/16 (2013.01)

(58) Field of Classification Search
CPC ................................. G01S 19/39; G01C 21/16
See application file for complete search history.

(56) References Cited

U.S. PATENT DOCUMENTS

| 2004/0064286 A1* | 4/2004 | Levi ....................... G01C 21/12 |
| | | 702/141 |
| 2009/0143972 A1* | 6/2009 | Kitamura .............. A61B 5/1112 |
| | | 701/504 |
| 2014/0088867 A1 | 3/2014 | Takaoka |

FOREIGN PATENT DOCUMENTS

JP          2012242179 A      12/2012

* cited by examiner

*Primary Examiner* — Anne M Antonucci
(74) *Attorney, Agent, or Firm* — Holtz, Holtz & Volek PC

(57) ABSTRACT

The information processing device 1 includes an acceleration acquisition unit, a vertical direction estimation unit, and a traveling direction estimation unit. The acceleration acquisition unit acquires acceleration occurring by the movement of the user. The vertical direction estimation unit estimates a first vertical direction based on the acceleration acquired by the acceleration acquisition unit. The traveling direction estimation unit estimates a first traveling direction (first traveling direction vector) corresponding to the first vertical direction (first vertical direction vector) estimated by the vertical direction estimation unit. The traveling direction estimation unit estimates a second traveling direction (second traveling direction vector) by shifting the first traveling direction based on the vertical direction as reference and the vertical direction (second vertical direction vector) estimated after the reference vertical direction by the vertical direction estimation unit.

18 Claims, 7 Drawing Sheets

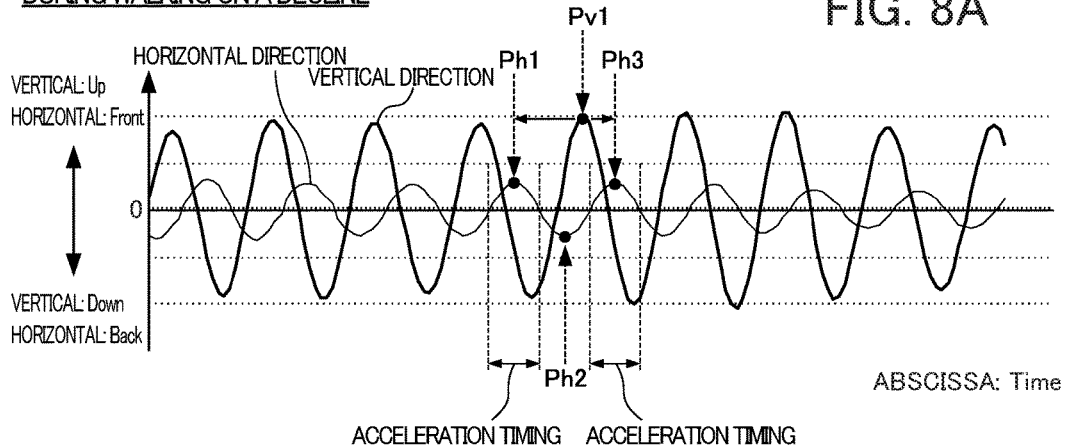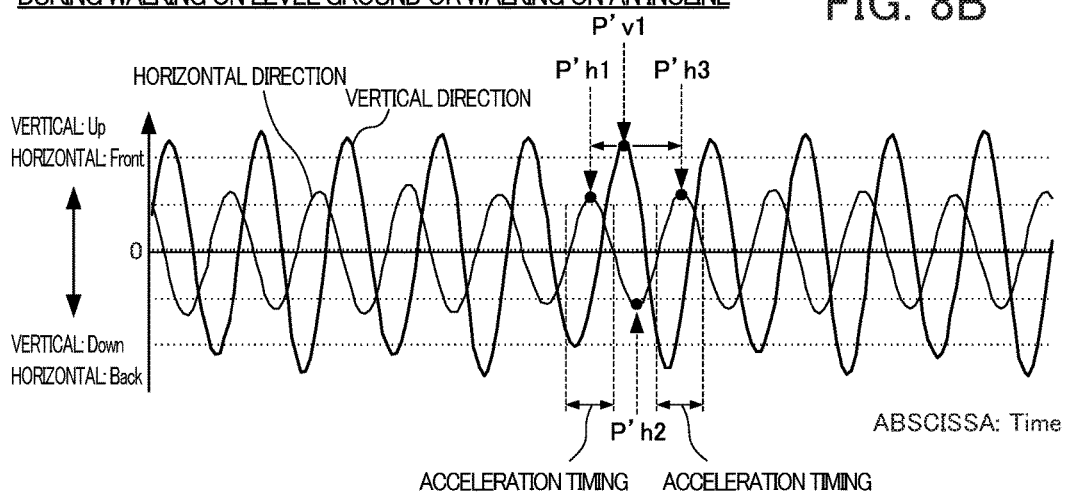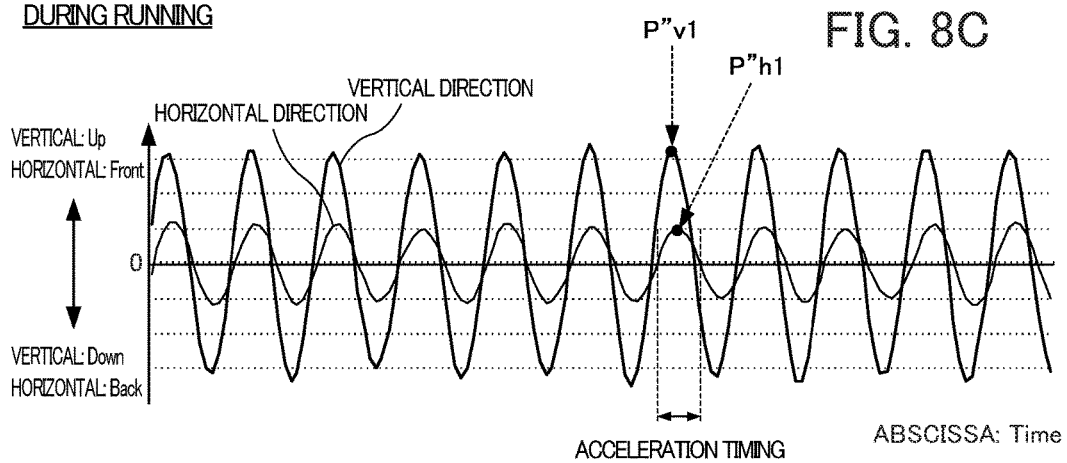

INFORMATION PROCESSING DEVICE, TRAVELING DIRECTION ESTIMATION METHOD AND STORAGE MEDIUM

This application is based upon and claims the benefit of priority from the prior Japanese Patent Application No. 2015-099756, filed May 15, 2015, and the prior Japanese Patent Application No. 2016-052366, filed Mar. 16, 2016, and the entire contents of which are incorporated herein by reference.

BACKGROUND OF THE INVENTION

Related Art

The present invention relates to an information processing device, a traveling direction estimation method and a storage medium.

Field of the Invention

Conventionally, a technology of autonomously estimating a current location of a pedestrian based on an input signal of an acceleration sensor has been known.

For example, Japanese Unexamined Patent Application Publication No. 2012-242179 discloses a technology of estimating a traveling direction of a pedestrian based on acceleration detected by an acceleration sensor.

However, in an algorithm for estimating the traveling direction from the input signal of the acceleration sensor, accuracy in estimating the traveling direction may lower depending on a course of travel, making it difficult to acquire an accurate estimation result of a current location.

SUMMARY OF THE INVENTION

The present invention has been made in view of such a situation, and has an object of estimating the traveling direction more appropriately.

In order to achieve the above-mentioned object, an information processing device according to an aspect of the present invention includes:

an information processing device comprising a processing unit, wherein the processing unit executes:

determination processing of determining whether or not a preset condition for acquiring a first traveling direction is satisfied;

first direction acquisition processing of acquiring a first acceleration applied to the information processing device, and acquiring a first direction based on the first acceleration, to which the information processing device is directed, when the preset condition is satisfied;

first traveling direction acquisition processing of acquiring the first traveling direction at a first timing, based on an acceleration component in a gravity direction of the first acceleration and an acceleration component in a direction perpendicular to the gravity direction of the first acceleration;

second direction acquisition processing of acquiring second acceleration applied to the information processing device, and acquiring a second direction based on the second acceleration, to which the information processing device is directed, after the first traveling direction being acquired; and second traveling direction estimation processing of estimating a second traveling direction based on the second direction, the first direction, and the first traveling direction.

BRIEF DESCRIPTION OF THE DRAWING

FIGS. 8A to 8C are a schematic view showing the corresponding relationship between acceleration in each of the vertical direction and front-back direction for the movement of a user (ordinate) and time (abscissa), with FIG. 8A being a graph showing the corresponding relationship between acceleration while walking on a decline and time, FIG. 8B being a graph showing the corresponding relationship between acceleration while walking on level ground or walking on an incline and time, and FIG. 8C being a graph showing the corresponding relationship between acceleration while running and time.

DETAILED DESCRIPTION OF THE PREFERRED EMBODIMENT

Hereinafter, embodiments of the present invention will be explained while referencing the drawings.

(Hardware Configuration)

Figure 1:
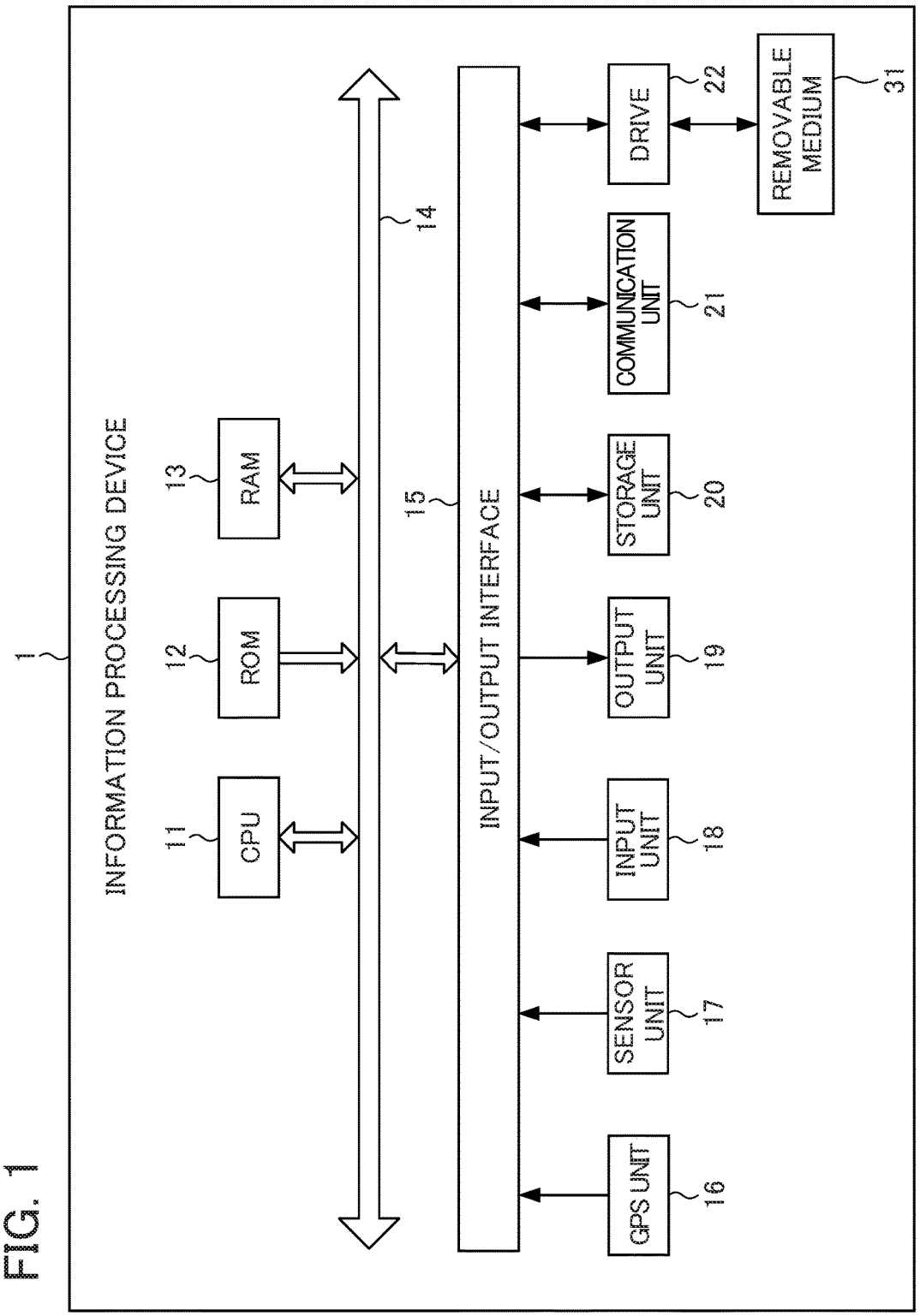
FIG. 1 is a block diagram showing the hardware configuration of an information processing device according to an embodiment of the present invention.
Figure 2A:
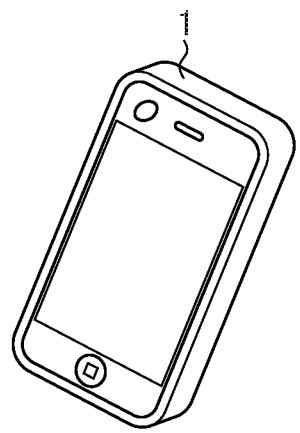
FIG. 2A is an external view of the information processing device of FIG. 1.
Figure 2B:
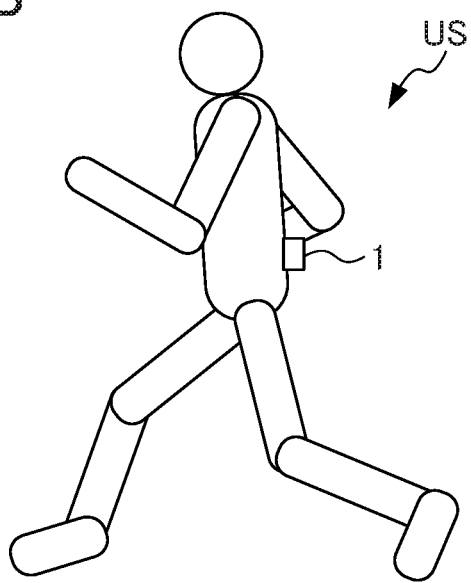
FIG. 2B is a diagram illustrating an example of a usage mode thereof.

FIG. 1 is a block diagram showing the hardware configuration of an information processing device 1 according to an embodiment of the present invention. An exterior appearance of the information processing device 1 is configured as a smartphone as illustrated in FIG. 2A, for example, and is worn at a region close to the trunk such as the waist of a user US during use as illustrated in FIG. 2B.

The information processing device 1 includes a CPU (Central Processing Unit) 11, ROM (Read Only Memory) 12, RAM (Random Access Memory) 13, a bus 14, an input/output interface 15, a GPS (Global Positioning System) unit 16, a sensor unit 17, and input unit 18, an output unit 19, a storage unit 20, a communication unit 21 and a drive 22.

The CPU 11 executes various processing in accordance with a program recorded in the ROM 12, or a program loaded from the storage unit 20 into the RAM 13. For example, the CPU 11 executes traveling direction estimation processing in accordance with a program for traveling direction estimation processing described later.

Data, etc. required upon the CPU 11 executing the various processing is stored in the RAM 13 as appropriate.

The CPU 11, ROM 12 and RAM 13 are connected to each other via the bus 14. In addition, the input/output interface 15 is also connected to this bus 14. The GPS unit 16, sensor unit 17, input unit 18, output unit 19, storage unit 20, communication unit 21 and drive 22 are connected to the input/output interface 15.

The GPS unit 16 includes an antenna, and acquires positional information of the information processing device 1 by receiving GPS signals sent from a plurality of GPS satellites.

The sensor unit 17 includes various sensors such as a three-axis acceleration sensor, a geomagnetic sensor, and a pressure sensor.

The input unit 18 is configured by various buttons, etc. and inputs various information in response to the instruction operations of the user.

The output unit 19 is configured by a display, a speaker, etc., and outputs images and sound.

The storage unit 20 is configured by a hard disk, DRAM (Dynamic Random Access Memory) or the like, and stores the data of various images.

The communication unit 21 controls communication to be performed with another device (not illustrated) via a network including the Internet.

Removable media 31 made from a magnetic disk, optical disk, magneto-optical disk, semiconductor memory or the like is installed as appropriate in the drive 22. A program read from the removable media 31 by the drive 22 is installed in the storage unit 20 as necessary. In addition, similarly to the storage unit 20, the removable media 31 can store various data such as the data of images stored in the storage unit 20.

(Functional Configuration)

Next, the functional configuration for executing the traveling direction estimation processing, among the functional configurations of the information processing device 1, will be explained by referencing FIG. 3.

Figure 3:
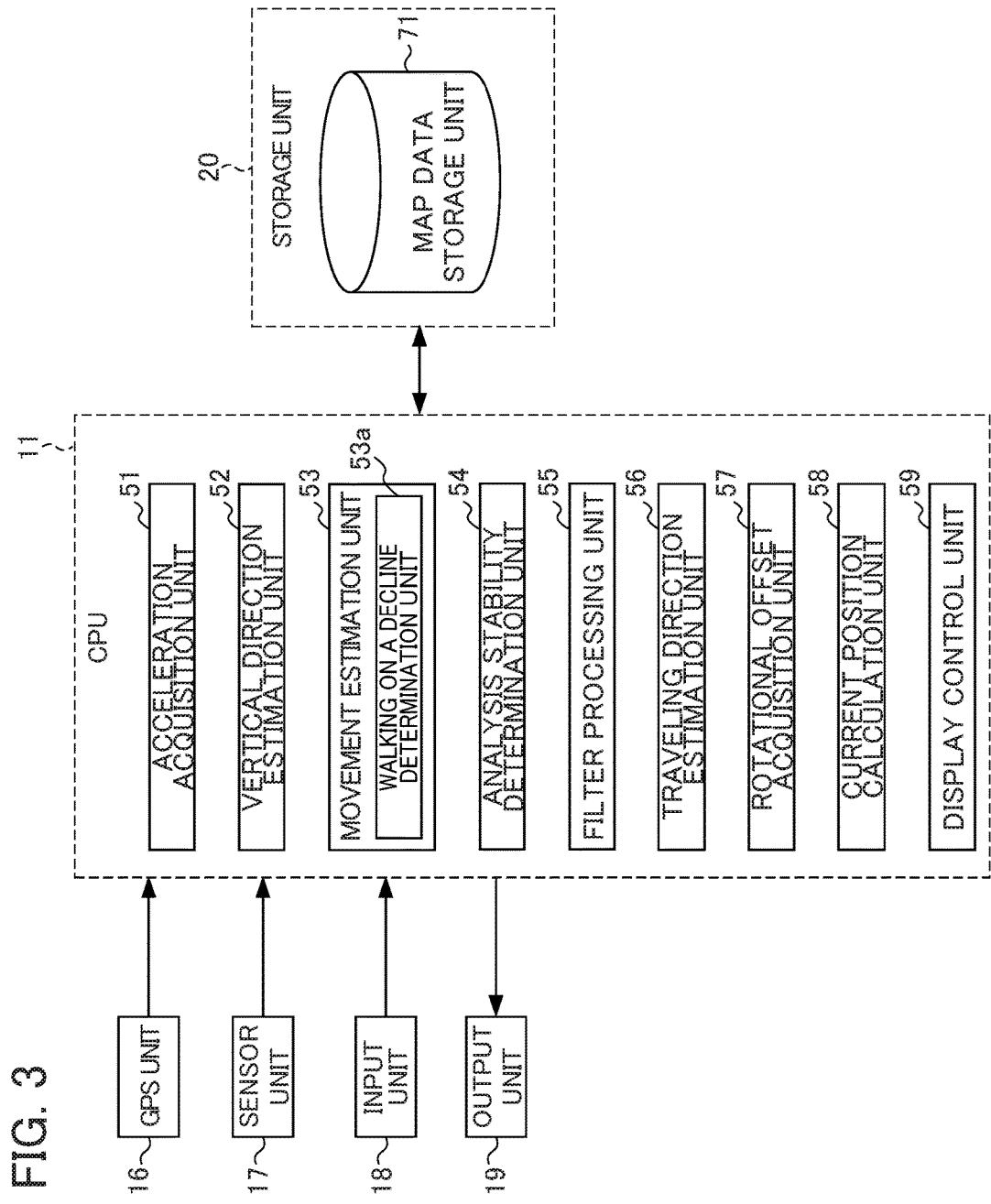
FIG. 3 is a functional block diagram showing the functional configuration for executing traveling direction estimation processing, among the functional configurations of the information processing device in FIG. 1.

FIG. 3 is a functional block diagram showing the functional configuration for executing the traveling direction estimation processing, among the functional configurations of such an information processing device 1 of FIG. 1.

Traveling direction estimation processing is a series of processing of: calculating a first vertical direction and a traveling direction, which are calculated references in the information processing device 1 worn by a user, by a predetermined calculating method based on input signals from the sensors; estimating a deviation of the traveling direction from the reference due to shift in wearing orientation afterwards without using the predetermined calculating method, based on deviation of the vertical direction from the reference that are sequentially estimated; and displaying a current location on a map.

Upon execution of the traveling direction estimation processing, as illustrated in FIG. 3, an acceleration acquisition unit 51, a vertical direction estimation unit 52, a movement estimation unit 53, an analysis stability determination unit 54, a filter processing unit 55, a traveling direction estimation unit 56, a rotational offset acquisition unit 57, a current position calculation unit 58, and a display control unit 59 function in a CPU 11.

In addition, a map data storage unit 71 is established in a region of the storage unit 20.

Data of maps to be displayed in the traveling direction estimation processing is stored in the map data storage unit 71.

The acceleration acquisition unit 51 acquires acceleration data from the sensor unit 17 every predetermined time period (e.g., every 0.2 seconds).

The vertical direction estimation unit 52 calculates a vertical direction vector based on the acceleration data acquired by the acceleration acquisition unit 51.

More specifically, the vertical direction acquisition unit 52 calculates the vertical direction vector as a reference (hereinafter referred to as "first vertical direction vector") by way of calculating an average value for the pre-set time period (e.g., 4 seconds, etc.) of the acceleration data (vertical component) acquired by the acceleration acquisition unit 51.

In addition, after calculation of the first vertical direction vector, the vertical direction acquisition unit 52 calculates vertical direction vectors sequentially (hereinafter referred to as "second vertical direction vector") by way of a similar calculating method to that of the first vertical direction vector.

The movement estimation unit 53 performs determination of whether the movement of the user being estimated is walking or running, based on the acceleration data.

It should be noted that, in the case of a person running, both legs of the user will be separated from the ground surface at the same time, and in the case of a person walking, both legs of the user will not be separated from the ground surface at the same time; therefore, "walking" and "running" in the present embodiment are distinguished by such a viewpoint.

More specifically, the movement estimation unit 53 determines that the user is running in the case of, for the respective accelerations acquired for the vertical direction and front-back direction, the magnitude of each acceleration being at least an acceleration threshold for a running determination, and the pitch indicated by the peaks of each acceleration (time interval of peaks) being no more than a pitch threshold for a running determination. On the other hand, the movement estimation unit 53 determines that the user is walking in the case of the magnitude of each acceleration being less than the acceleration threshold for a running determination, or the pitch indicated by the peaks of each acceleration being less than the pitch for a running determination. Herein, the acceleration threshold and pitch threshold for running determination related to the acceleration in the vertical direction and front-back direction can be set based on experimental values or simulation values.

In addition, the movement estimation unit 53 includes a walking on a decline determination unit 53a. The walking on a decline determination unit 53a acquires barometric data from the barometric pressure sensor in the sensor unit 17. The walking on a decline determination unit 53a determines whether or not the user advances along a descending road based on change in barometric pressure (walking on a decline determination).

The analysis stability determination unit 54 executes analysis stability determination processing of determining whether or not a current situation satisfies a condition for stably calculating a first traveling direction vector which is described later (hereinafter referred to as "stable calculation condition"). More specifically, the analysis stability determination unit 54 executes the analysis stability determination processing and determines that the current situation does not satisfy the stable calculation condition for the first travel direction vector in the case of: an orientation of the traveling direction vector being calculated (front and back in the traveling direction) reversing more frequently than a preset frequency (for example, three times per second); and a variation in the first vertical direction vector being calculated being at least a preset angle (for example, 30°). Since the estimation of the traveling direction tends to have more errors during walking on a decline than during walking on level ground or walking on an incline, the analysis stability determination unit 54 can also be configured to determine that the condition for stably calculating the first traveling direction vector is not satisfied during walking on a decline. In such a case, walking on a decline can be determined by: using the barometric pressure sensor; referring to a gradient in map data; referring to a change in altitude acquired by means of GPS; or referring to movement estimation results acquired from pattern matching between waveform models of acceleration etc. during walking on a decline and detected values. Walking on a decline can also be determined by a combination thereof.

The filter processing unit 55 executes, on the acceleration data acquired by the acceleration acquisition unit 51, filter processing according to the movement of the user estimated in the movement estimation unit 53.

More specifically, in the case of the movement of the user estimated in the movement estimation unit 53 being walking, the filter processing unit 55 executes processing by way of a band-pass filter (band-pass filter for walking) that allows a frequency band of a predetermined range centered around 2.0 Hz to pass, on the acquired acceleration data (horizontal component). In the case of the movement of the user estimated in the movement estimation unit 53 being running, the filter processing unit 55 executes processing according to a band-pass filter (band-pass filter for running) that allows a frequency band of a predetermined range centered around 3.0 Hz to pass, on the acquired acceleration data (horizontal component).

The traveling direction estimation unit 56, for every movement of the user (for example, walking on a decline, walking on level ground or walking on an incline, or running), calculates the traveling direction vector as a reference from the relationship between the timing of the extreme value of the vertical direction vector (peak) and the acceleration timing, by way of a different traveling direction estimation method (for example, traveling direction estimation method for during walking on a decline, traveling direction estimation method for during walking on level ground and walking on an incline, or traveling direction estimation method for during running), based on the vertical direction vector calculated by the vertical direction estimation unit 52 and the acceleration data subjected to the filter processing by the filter processing unit 55.

More specifically, in the case of the movement estimation unit 53 determining the movement of the user as being walking on a decline, the traveling direction estimation unit 56 estimates as being forward the direction of the extreme value of acceleration data (horizontal component) nearest in a future direction on the time axis Ph3 (or the second nearest in the past direction on the time axis Ph1), relative to a timing Pv1 at which the vertical direction vector indicates an upward extreme value (peak), as illustrated in FIG. 8A. In addition, as illustrated in FIG. 8B, in the case of the movement estimation unit 53 determining the movement of the user as not being walking on a decline (walking on level ground or walking on an incline), the traveling direction estimation unit 56 estimates as being forward the direction of the extreme value of acceleration data (horizontal component) the second nearest in a future direction on the time axis P'h3 (or nearest in the past direction on the time axis P'h1), relative to a timing P'v1 at which the vertical direction vector indicates an upward extreme value (peak). On the other hand, as illustrated in FIG. 8C, in the case of the movement estimation unit 53 determining the movement of the user as being running, the traveling direction estimation unit 56 estimates the direction of the extreme value P"h1 of the acceleration data (horizontal component) belonging to the time period of the same half-cycle as forward, relative to the timing P"v1 at which the vertical direction vector indicates an upward extreme value (peak).

It should be noted that various methods other than that described above can be employed as the estimation method of the traveling direction in the traveling direction estimation unit 56.

In addition, the traveling direction estimation unit 56 calculates traveling direction vectors sequentially (hereinafter referred to as "second traveling direction vector") based on the first vertical direction vector, the first traveling direction vector, and the second vertical direction vector. In this case, the traveling direction estimation unit 56 calculates the second traveling direction vector by way of a calculation method different from that of the first traveling direction vector.

More specifically, the traveling direction estimation unit 56 estimates the second traveling direction vector regardless of a traveling course, using a deviation from the reference of the vertical direction vector that can be easily estimated in any state, in view of a fact that a relationship between a vertical direction and a travel direction on a horizontal plane is maintained even if a device posture is changed (shift in wearing position, user posture, etc.).

Figure 4:
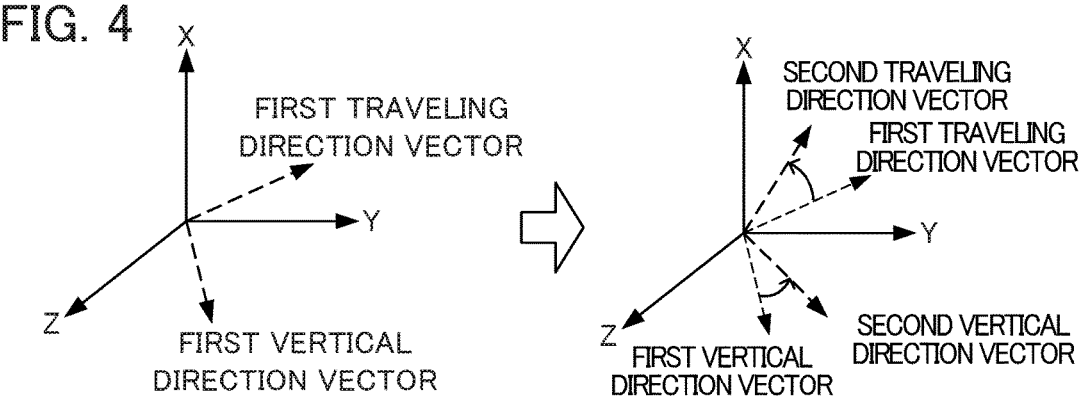
FIG. 4 is a schematic view illustrating a calculating method of a second traveling direction vector.

FIG. 4 is a schematic view illustrating a calculating method of a second traveling direction vector.

As illustrated in FIG. 4, the traveling direction estimation unit 56 acquires a rotation matrix for transforming the first vertical direction vector into the second vertical direction vector (hereinafter referred to as "relative rotation matrix"), and rotates the first travel direction vector by means of the relative rotation matrix to thereby calculate the second travel direction vector.

The second travel direction vector can thus be calculated robustly despite shifts in traveling course and device posture, by a calculating method different from that used to calculate the first travel direction vector.

Furthermore, the traveling direction estimation unit 56 projects the second traveling direction vector onto a horizontal plane defined by the second vertical direction vector, and then acquires an angle θbase in the travel direction on a local coordinate on the horizontal plane. It should be noted that the local coordinate is a relative coordinate assigned to the information processing device 1, relative to absolute coordinate assigned to the land surface.

Figure 5:
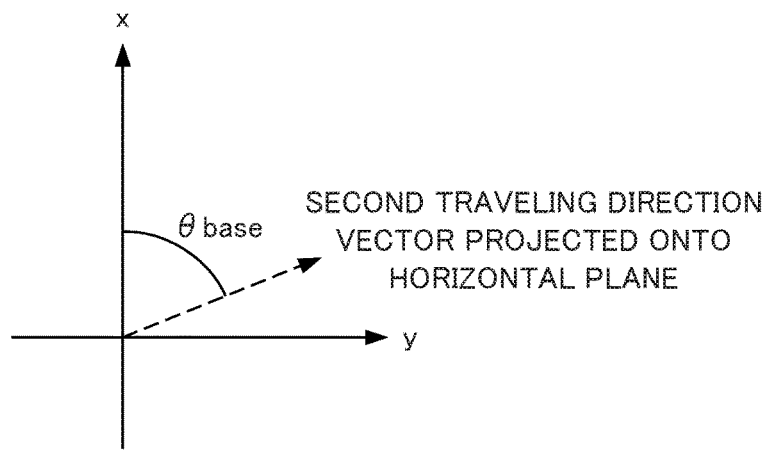
FIG. 5 is a schematic view illustrating the second traveling direction vector projected onto a horizontal plane.

FIG. 5 is a schematic view illustrating the second traveling direction vector projected onto a horizontal plane.

In the example shown in FIG. 5, the projected vector of the second traveling direction vector is rotated rightward with respect to the x axis of the local coordinate, by the angle θbase.

The traveling direction estimation unit 56 projects a plurality of second acceleration vectors (for example, from most recent 1 second) represented by the acceleration data acquired by the acceleration acquisition unit 51 onto a horizontal plane defined by the second vertical direction vector, and calculates for each of the acceleration vectors an angle θtmp on the local coordinate on the horizontal plane. The traveling direction estimation unit 56 then obtains a weighted average of, among these acceleration vectors, ones having the angle θtmp close to the angle θbase (for example, ones within ±90° from the angle θbase) with lengths of vectors being weighted, and calculates an angle θ of the weighted-averaged vector on the local coordinate, to thereby estimate an averaged traveling direction (hereinafter referred to as "average traveling direction") θ.

Figure 6:
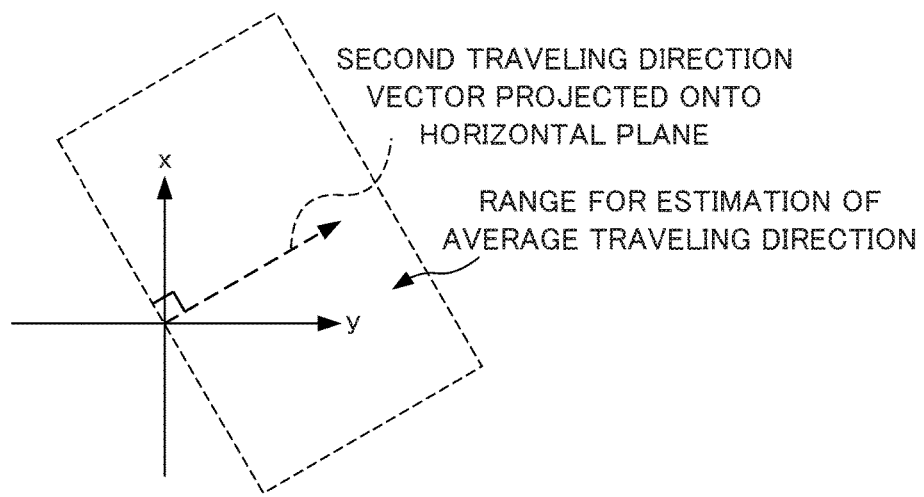
FIG. 6 is a schematic view illustrating a range of an acceleration vector used for estimation of an average traveling direction θ.

FIG. 6 is a schematic view illustrating a range of an acceleration vector used for estimation of an average traveling direction θ.

As illustrated in FIG. 6, the present embodiment uses the acceleration vectors within ±90° from the angle θbase which are used for estimation of the average traveling direction θ.

This allows broader acquisition of the traveling direction, not only in the case of moving straight ahead in the local coordinate, but also in the case of irregular traveling direction such as oblique forward movement. This also allows reduction in the accuracy required in estimating the first traveling direction vector, to thereby allow more correct estimation of the traveling direction.

As described later, in the case of an offset of the traveling direction in the local coordinate being defined by the rotational offset acquisition unit 57, the traveling direction estimation unit 56 offsets the traveling direction by adding the offset to the average traveling direction θ.

The rotational offset acquisition unit 57 acquires an offset of the traveling direction in the local coordinate, by comparing, on the horizontal plane of the local coordinate, the angle θbase of the traveling direction acquired from projection of the second traveling direction vector with the average traveling direction θ estimated by weighted-averaging the projection of the acceleration vectors.

More specifically, the rotational offset acquisition unit 57 calculates sequentially a difference between the average traveling direction θ and the angle θbase (θ−θbase) on the horizontal plane, and, in the case of the difference being at least a predetermined amount for at least a predetermined period of time (for example, several dozen seconds), defines the difference as the offset of the traveling direction θoffset. Upon subsequent traveling direction estimation, the traveling direction estimation unit 56 adds the offset of the traveling direction θoffset to thereby offset the traveling direction. Even in the case of the shift in posture of the information processing device 1 being rotation about the vertical vector, the rotation can thus be offset as the offset of the traveling direction, to thereby allow robust estimation of the traveling direction despite the shift in posture of the information processing device 1.

The current position calculation unit 58 calculates the current position from the data of acceleration in the horizontal direction, depending on the estimation results of the traveling direction. The current position is thereby autonomously calculated without employing a positioning system such as GPS.

The display control unit 59 references the data of maps stored in the map data storage unit 71, and displays the current position calculated by the current position calculation unit 58 on a map.

(Operation)

Next, operation will be explained.

Figure 7:
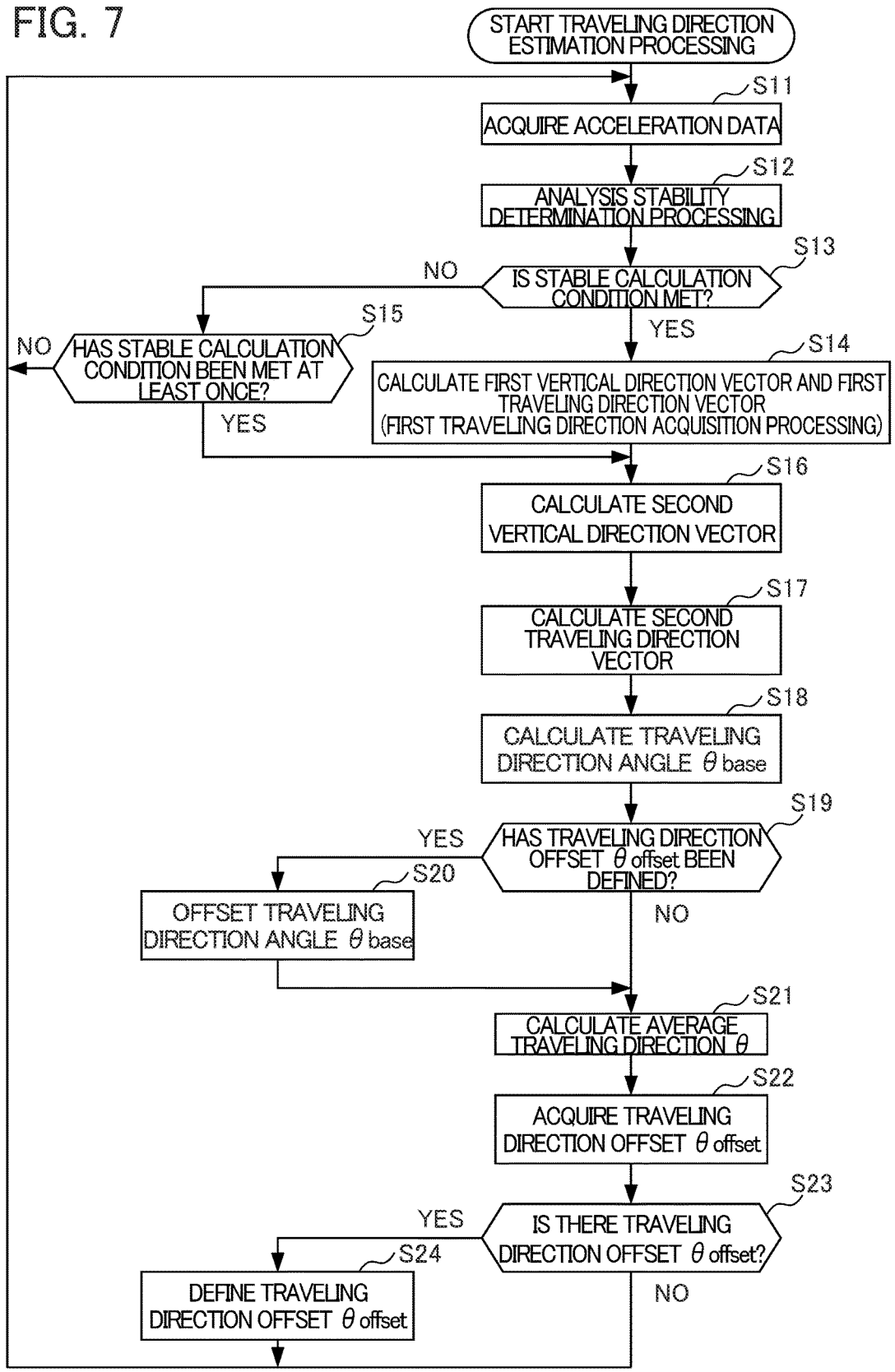
FIG. 7 is a flowchart illustrating the flow of traveling direction estimation processing executed by the information processing device of FIG. 1 having the functional configuration of FIG. 3.

FIG. 7 is a flowchart illustrating the flow of traveling direction estimation processing executed by the information processing device 1 of FIG. 1 having the functional configuration of FIG. 3.

The traveling direction estimation processing is started in the case of not being able to receive a GPS signal at the GPS unit 16 after a predetermined time, and is repeatedly executed until it becomes possible to receive a GPS signal at the GPS unit 16.

In Step S11, the acceleration acquisition unit 51 acquires acceleration data from the sensor unit 17 every predetermined time period (e.g., every 0.2 seconds).

In Step S12, the analysis stability determination unit 54 executes the analysis stability determination processing for determining fulfillment of the stable calculation condition of the first traveling direction vector. More specifically, the analysis stability determination unit 54 determines, by the analysis stability determination processing: whether or not an orientation of the traveling direction vector being calculated (front and back in the traveling direction) reverses more frequently than a preset frequency (for example, three times per second); and whether or not a variation in the first vertical direction vector being calculated is at least a preset angle (for example, 30°). The analysis stability determination processing can also be employed for determination of walking on a decline.

In Step S13, the analysis stability determination unit 54 determines whether or not the current situation satisfies the stable calculation condition of the first traveling direction vector.

In the case of the current situation satisfying the stable calculation condition of the first traveling direction vector, it is determined as YES in Step S13, and the processing advances to Step S14.

On the other hand, if the current situation does not satisfy the stable calculation condition of the first traveling direction vector, it is determined as NO in Step S13, and the processing advances to Step S15.

In Step S14, the vertical direction estimation unit 52 calculates the first vertical direction vector based on the acceleration data acquired by the acceleration acquisition unit 51. The traveling direction estimation unit 55, for every movement of the user, calculates the first traveling direction vector from the relationship between the timing of the extreme value of the vertical direction vector (peak) and the acceleration timing, by way of a different traveling direction estimation method, based on the vertical direction vector calculated by the vertical direction estimation unit 52 and the acceleration data subjected to the filter processing by the filter processing unit 55 (first traveling direction acquisition processing).

In Step S15, the analysis stability determination unit 54 determines whether or not the stable calculation condition of the first traveling direction vector has been met at least once (in other words, the stable calculation condition has been satisfied). A time period for determination of whether or not the stable calculation condition has been satisfied can be: a period after the start of the traveling direction estimation processing; every predetermined amount of time (for example, 5 minutes); and the like.

In the case of the stable calculation condition of the first traveling direction vector being determined to have been met at least once, it is determined as YES in Step S15, and the processing advances to Step S16.

On the other hand, in the case of the stable calculation condition of the first traveling direction vector being determined to never have been met, it is determined as NO in Step S15, and the traveling direction estimation processing is repeated.

In Step S16, the vertical direction estimation unit 52 calculates the vertical direction vector by way of calculating the average value for the pre-set time period (e.g., 4 seconds, etc.) of the acceleration data (vertical component) acquired by the acceleration acquisition unit 51.

In Step S17, the traveling direction estimation unit 56 calculates the second traveling direction vector based on the first vertical direction vector, the first traveling direction vector, and the second vertical direction vector.

In Step S18, the traveling direction estimation unit 56 projects the second traveling direction vector onto a horizontal plane defined by the second vertical direction vector, and then acquires an angle θbase in the travel direction on a local coordinate on the horizontal plane.

In Step S19, the rotational offset acquisition unit 57 determines whether or not the offset θoffset of the traveling direction in the local coordinate has been set.

If the offset θoffset of the traveling direction in the local coordinate has been set, it is determined as YES in Step S19, and the processing advances to Step S20.

On the other hand, if the offset θoffset of the traveling direction in the local coordinate has not been set, it is determined as NO in Step S19, and the processing advances to Step S21.

In Step S20, the traveling direction estimation unit 56 offsets the traveling direction by adding the offset of the traveling direction in the local coordinate being defined by the rotational offset acquisition unit 57 to the angle of the traveling direction θbase.

After Step S20, the processing advances to Step S21.

In Step S21, the traveling direction estimation unit 56 estimates the average traveling direction θ. More specifically, the traveling direction estimation unit 56 projects a plurality of second acceleration vectors (for example, from most recent 1 second) represented by the acceleration data acquired by the acceleration acquisition unit 51 onto a horizontal plane defined by the second vertical direction vector, obtains a weighted average of ones having the angle θtmp close to the angle θbase (for example, ones within ±90° from the angle θbase) with lengths of vectors being weighted, and calculates an angle θ of the vector thus acquired on the local coordinate, to thereby estimate the average traveling direction θ.

In Step S22, the rotational offset acquisition unit 57 acquires an offset θoffset of the traveling direction in the local coordinate, by comparing, on the horizontal plane of the local coordinate, the angle θbase of the traveling direction acquired from projection of the second traveling direction vector with the average traveling direction θ estimated by weighted-averaging the projection of the acceleration vectors.

In Step S23, the rotational offset acquisition unit 57 determines whether or not the offset θoffset of the traveling direction in the local coordinate exits.

If the offset θoffset of the traveling direction in the local coordinate exists, it is determined as YES in Step S23, and the processing advances to Step S24.

On the other hand, if the offset θoffset of the traveling direction in the local coordinate does not exist, it is determined as NO in Step S23, and the traveling direction estimation processing is repeated.

In Step S24, the rotational offset acquisition unit 57 defines the offset θoffset of the traveling direction in the local coordinate being acquired.

After Step S24, the traveling direction estimation processing is repeated.

Figure 9:
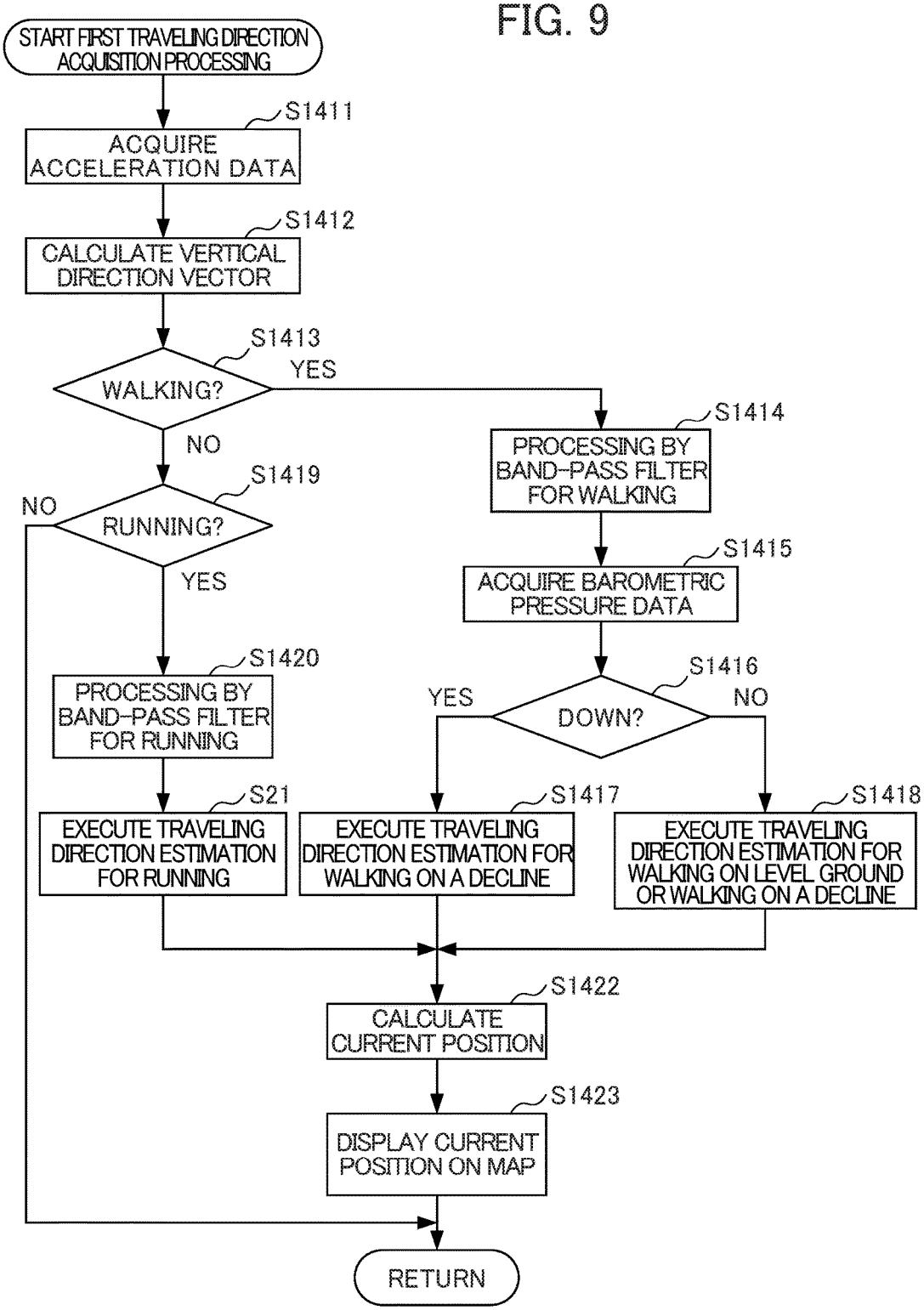
FIG. 9 is a flowchart illustrating the flow of the first traveling direction acquisition processing for acquiring a first traveling direction in Step S14 of FIG. 7.

FIG. 9 is a flowchart illustrating the flow of the first traveling direction acquisition processing for acquiring a first traveling direction in Step S14 of FIG. 7.

In Step S1411, the acceleration acquisition unit 51 acquires acceleration data from the sensor unit 17 every predetermined time period (e.g., every 0.2 seconds).

In Step S1412, the vertical direction estimation unit 52 calculates the vertical direction vector by calculating the average value of a pre-set time (e.g., 4 seconds, etc.) in the acceleration data (vertical component) acquired by the acceleration acquisition unit 51.

In Step S1413, the movement estimation unit 53 performs determination of whether the movement of the user to be estimated is walking, based on the acceleration data. More specifically, the movement estimation unit 53 determines that the user is walking in the case of the magnitude of each acceleration acquired in Step S1411 being less than an acceleration threshold for running determination, or the pitch indicated by the peaks (extreme value) of each acceleration being less than a pitch threshold for running determination.

In the case of the movement of the user being walking, it is determined as YES in Step S1413, and the processing advances to Step S1414.

On the other hand, in the case of the movement of the user not being walking, it is determined as NO in Step S1413, and the processing advances to Step S1419.

In Step S1414, the filter processing unit 55 executes processing according to a band-pass filter (band-pass filter for walking) that allows a frequency band of a predetermined range centered around 2.0 Hz to pass, on the acceleration data (horizontal component) acquired in Step S1411.

In Step S1415, a walking on a decline determination unit 53*a* acquires barometric data from the barometric pressure sensor in the sensor unit 17.

In Step S1416, the walking on a decline determination unit 53*a* determines whether or not the user advances along a descending road based on change in barometric pressure (walking on a decline determination). In the walking on a decline determination unit 53*a*, other than determining walking on a decline by using the barometric pressure sensor, the walking on a decline determination can be performed by: referring to a gradient in map data; referring to a change in altitude acquired by means of GPS; or referring to movement estimation results acquired from pattern matching between waveform models of acceleration etc. during walking on a decline and detected values. Walking on a decline determination can also be performed by a combination thereof.

In the case of the user advancing along a descending road, it is determined as YES in Step S1416, and the processing advances to Step S1417.

On the contrary, in the case of the user not advancing along a descending road, it is determined as NO in Step S1416, and the processing advances to Step S1418.

In Step S1417, the traveling direction estimation unit 56 estimates as forward the direction of the extreme value of the acceleration data (horizontal component) that is closest in the future direction on the time axis (or the second closest in the past direction on the time axis), relative to the timing at which the vertical direction vector specified in Step S1412 indicates an extreme value (peak) in the upward direction. In other words, the traveling direction estimation unit 55 executes the traveling direction estimation method for when walking on a decline.

In Step S1418, the traveling direction estimation unit 55 estimates as forward the direction of the extreme value of the acceleration data (horizontal component) that is the second closest in the future direction on the time axis (or closest in the past direction on the time axis), relative to the timing at which the vertical direction vector specified in Step S1412 indicates an extreme value (peak) in the upward direction. In other words, the traveling direction estimation unit 55 executes the traveling direction estimation method for when walking on level ground or walking on an incline.

In Step S1419, the movement estimation unit 53 performs determination of whether the movement of the user is running based on the acceleration data. More specifically, the movement estimation unit 53 determines that the user is running in the case of, for the respective accelerations in the vertical direction and front-back direction acquired in Step S1411, the magnitude of each acceleration being at least an acceleration threshold for running determination, and the pitch indicated by the peaks of each acceleration (time interval of peaks) being no more than a pitch threshold for running determination.

In the case of the movement of the user being running, it is determined as YES in Step S1419, and the processing advances to Step S1420.

On the other hand, in the case of the movement of the user not being running, it is determined as NO in Step S1419, and the traveling direction estimation processing is repeated.

In Step S1420, the filter processing unit 55 executes processing according to a band-pass filter (band-pass filter for running) that allows a frequency band of a predetermined range centered around 3.0 Hz to pass, on the acceleration data (horizontal component) acquired in Step S1411.

In Step S1421, the traveling direction estimation unit 56 estimates as forward the direction of the extreme value in the acceleration data (horizontal component) belonging to a time period of the same half-cycle, relative to the timing at which the vertical direction vector specified in Step S1412 indicates an extreme value (peak) in the upward direction. In other words, the traveling direction estimation unit 56 executes the traveling direction estimation method for when running.

After Steps S1417, S1418 and S1421, the current position calculation unit 56 calculates in Step S1422 the current position from the data of acceleration in the horizontal direction, depending on the estimation results of the traveling direction.

In Step S1423, the display control unit 59 refers to the data of maps stored in the map data storage unit 71, and displays the current position calculated by the current position calculation unit 58 on a map.

After Step S1423, the traveling direction estimation processing is repeated until an end condition is fulfilled.

In the above described processing, the first vertical direction vector is estimated based on the acceleration data; the first traveling direction vector is estimated for the first vertical direction vector by a predetermined traveling direction estimation method; and the traveling direction vector is estimated depending on deviation of the vertical direction vector, which is sequentially estimated, from the first vertical direction vector.

The second travel direction vector can thus be calculated robustly, despite shifts in traveling course and device posture.

Therefore, it is possible to estimate the traveling direction more accurately.

In addition, upon estimation of the first traveling direction vector, the traveling direction estimation methods for estimating the user's traveling direction are switched according to the user movement (walking on a decline, walking on level ground or walking on an incline, running, and the like).

Therefore, it is possible to estimate the traveling direction more accurately according to the situation of the user.

In addition, the plurality of second acceleration vectors is projected onto a horizontal plane defined by the second vertical direction vector, and among these acceleration vectors being projected, ones having the angle θtmp on the horizontal plane that is close to the angle θbase of the traveling direction represented by the projection of the second traveling direction vectors are weighted-averaged, with lengths of vectors being weighted. Furthermore, by calculating the angle θ of the vector obtained as a result of weighted-averaging in the local coordinate, the average traveling direction θ is estimated.

This allows broader acquisition of the traveling direction, not only in the case of moving straight ahead in the local coordinate, but also in the case of irregular traveling direction such as oblique forward movement. This also allows for a reduction in the accuracy required in estimating the first traveling direction vector, to thereby allow more correct estimation of the traveling direction.

Moreover, a difference between the average traveling direction θ and the angle θbase (θ−θbase) is calculated sequentially on the horizontal plane, and, in the case of the difference being at least a predetermined amount for at least a predetermined period of time (for example, several dozen seconds), the difference is defined as the offset of the traveling direction θoffset. Upon subsequent traveling direction estimation, by adding the offset of the traveling direction θoffset, the traveling direction is offset.

As a result, even in the case of the shift in posture of the information processing device 1 being rotation about the vertical vector, the rotation can be offset as the offset of the traveling direction, to thereby allow robust estimation of the traveling direction despite the shift in posture of the information processing device 1.

The information processing device 1 configured as above includes the acceleration acquisition unit 51, the vertical direction estimation unit 52, and the traveling direction estimation unit 56.

The acceleration acquisition unit 51 acquires acceleration occurring by the movement of the user.

The vertical direction estimation unit 52 estimates a vertical direction based on the acceleration acquired by the acceleration acquisition unit 51.

The traveling direction estimation unit 56 estimates a first traveling direction (first traveling direction vector) corresponding to the first vertical direction (first vertical direction vector) estimated by the vertical direction estimation unit 52.

The traveling direction estimation unit 56 estimates a second traveling direction (second traveling direction vector) by shifting the first traveling direction based on the vertical direction as reference and the vertical direction (second vertical direction vector) estimated after the reference vertical direction by the vertical direction estimation unit 52.

The first vertical direction vector is estimated based on the acceleration being acquired; the first traveling direction vector is estimated for the first vertical direction vector by a predetermined traveling direction estimation method; and the traveling direction vector is estimated depending on deviation of the vertical direction vector, which is sequentially estimated, from the first vertical direction vector.

The second travel direction vector can thus be calculated robustly, despite shifts in traveling course and device posture.

Therefore, it is possible to estimate the traveling direction more accurately.

In addition, the information processing device 1 includes the movement estimation unit 53.

The movement estimation unit 53 estimates movement of the user based on the acceleration acquired by the acceleration acquisition unit 51.

The traveling direction estimation unit 56 estimates the first traveling direction by way of the direction estimation method according to a result of estimation by the movement estimation unit 53.

As a result, upon estimation of the first traveling direction, the estimation methods for estimating the user's traveling direction are switched according to the user movement (walking on a decline, walking on level ground or walking on an incline, running, and the like).

Therefore, it is possible to estimate the traveling direction more accurately according to the situation of the user.

In addition, the traveling direction estimation unit 56 projects a vector indicating the second traveling direction onto a horizontal plane defined by the vertical direction estimated after the reference vertical direction, and, on the horizontal plane, estimates an averaged traveling direction (traveling direction θ) based on a plurality of vectors of acceleration within a set angle from a direction of the vector indicating the second traveling direction.

This allows broader acquisition of the traveling direction, not only in the case of moving straight ahead, but also in the case of irregular traveling direction such as oblique forward movement. This also allows for a reduction in the accuracy required in estimating the first traveling direction, to thereby allow more correct estimation of the traveling direction.

The information processing device 1 further includes the rotational offset acquisition unit 57.

The rotational offset acquisition unit 57, in the case of at least a predetermined difference existing for at least a threshold period of time between: a direction of the vector indicating the second traveling direction projected onto the horizontal plane defined by the vertical direction estimated after the reference vertical direction; and the averaged traveling direction, acquires the difference as an offset for the traveling direction.

Even in the case of the shift in posture of the information processing device 1 being rotation about the vertical direction, the rotation can thus be acquired as the offset of the traveling direction.

In addition, the traveling direction estimation unit 56 offsets the traveling direction by adding the difference acquired by the rotational offset acquisition unit 57 to the averaged traveling direction.

Even in the case of the shift in posture of the information processing device 1 being rotation about the vertical direction, the rotation can thus be offset as the offset of the traveling direction, to thereby allow robust estimation of the traveling direction despite the shift in posture of the information processing device 1.

It should be noted that the present invention is not to be limited to the aforementioned embodiment, and that modifications, improvements, etc. within a scope that can achieve the objects of the present invention are included in the present invention.

In the above described embodiment, for determination of fulfillment of the stable calculation condition, the current situation is determined not to satisfy the stable calculation condition for the reference travel direction vector in the case of: an orientation of the traveling direction vector being calculated (front and back in the traveling direction) reversing more frequently than a preset frequency (for example, three times per second); and a variation in the first vertical direction vector being calculated being at least a preset angle (for example, 30°). Alternatively, acceleration data of the user walking on level ground can be acquired in advance in order to define the stable calculation condition, and, upon determination of fulfillment of the stable calculation condition, a waveform of the acceleration data acquired in advance can be matched against a waveform of current acceleration data detected.

This allows acquisition of the stable calculation condition appropriate to the user, and more correct calculation of the first traveling direction vector.

In addition, the above described embodiment has explained that the rotational offset acquisition unit 57 calculates sequentially a difference between the angle θbase and the average traveling direction θ (θ−θbase) on the horizontal plane based on the acceleration data acquired by the acceleration acquisition unit 51, and, in the case of the difference being at least a predetermined amount for at least a predetermined period of time (for example, several dozen seconds), defines the difference as the offset of the traveling direction θoffset. Alternatively, the offset for the traveling direction can be defined by calculating the traveling direction or deviation in the traveling direction based on map data or angular velocity data acquired by a gyro sensor, instead of, or along with, the acceleration data acquired by the acceleration acquisition unit 51.

This allows definition of the offset for the traveling direction by various means.

In addition, although the traveling direction estimation processing is configured to be executed in the case of not being able to receive a GPS signal in the aforementioned embodiment, it is not limited thereto. In other words, it may perform in conjunction with traveling direction estimation processing also in the case of being able to receive a GPS signal, and then adopt the traveling direction that is more reliable, among the traveling direction based on the GPS signal and the traveling direction based on the traveling direction estimation processing.

In addition, although the information processing device 1 to which the present invention is applied is explained with the example of a smartphone in the aforementioned embodiment, it is not particularly limited thereto.

For example, the present invention can be applied to general electronic devices including an acceleration sensor that can be worn close to the trunk. More specifically, for example, the present invention is applicable to a pedometer, wearable terminal device, portable navigation device, mobile telephone, portable game console, and the like.

The aforementioned series of processing can be implemented by hardware, and can be implemented by software.

In other words, the functional configuration of FIG. 3 is merely an exemplification, and it is not particularly limited thereto. More specifically, it is sufficient so long as a function enabling the aforementioned series of processing to be executed as a whole to be equipped to the information processing device 1, and what types of functional blocks are used in order to realize this function are not particularly limited to the example of FIG. 3.

In addition, one functional block may be configured by a unit of hardware, may be configured by a unit of software, or may be configured by a combination thereof.

In the case of having the series of processing executed by software, a program constituting this software is installed from a network or recording medium to a computer or the like.

The computer may be a computer built into dedicated hardware. In addition, the computer may be a computer capable of executing various functions by installing various programs, e.g., a general-purpose personal computer.

The storage medium containing such a program not only can be constituted by the removable medium 31 shown in FIG. 3 which is distributed separately from the device main body in order to supply the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) disk or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present disclosure, the steps describing the program recorded in the storage medium include not only the processing executed in a time series following this order, but also processing executed in parallel or individually, which is not necessarily executed in a time series.

In addition, the terminology of the system in the present disclosure is to indicate the entire device constituted by a plurality of devices, a plurality of means, or the like.

Although some embodiments of the present invention have been described above, the embodiments are merely exemplifications, and are not to limit the technical scope of the present invention. Various other embodiments can be assumed for the present invention, and various modifications such as omissions and replacements are possible without departing from the spirit of the present invention. Such embodiments and modifications thereof are included in the scope of the invention and the summary described in the present disclosure, are included in the invention recited in the claims as well as the equivalent scope thereof.

What is claimed is:

1. An information processing device comprising:
   a sensor; and
   a hardware processor which, under control of a program stored in a memory, executes processing comprising:
      determination processing of determining whether or not a preset condition for acquiring a first traveling direction is satisfied;
      first direction acquisition processing of acquiring, based on an output of the sensor, a first acceleration applied to the information processing device, and acquiring a first direction based on the first acceleration, to which the information processing device is directed, when the preset condition is satisfied;
      first traveling direction acquisition processing of acquiring the first traveling direction at a first timing, based on an acceleration component in a gravity direction of the first acceleration and an acceleration component in a direction perpendicular to the gravity direction of the first acceleration;
      second direction acquisition processing of acquiring a second acceleration applied to the information processing device, and acquiring a second direction based on the second acceleration, to which the information processing device is directed, after the first traveling direction has been acquired; and
      second traveling direction estimation processing of estimating a second traveling direction based on the second direction, the first direction, and the first traveling direction,
   wherein the processor executes, in the determination processing, processing of determining that a condition for stably estimating the first traveling direction is not satisfied when one of (i) the first traveling direction being acquired reverses more frequently than a preset frequency, and (ii) a variation in the first direction being acquired is at least a preset angle.

2. The information processing device according to claim 1, wherein the processor executes, in the second traveling direction estimation processing, processing of changing the first traveling direction based on a difference between the first direction and the second direction, and estimating the first traveling direction having been changed as the second traveling direction.

3. The information processing device according to claim 1, wherein the processor executes, as the first traveling direction acquisition processing, movement estimation processing for estimating movement based on the first acceleration having been acquired, and processing of acquiring the first traveling direction at a first timing by direction estimation methods according to an estimation result of the movement estimation processing.

4. The information processing device according to claim 3, wherein the processor executes, in the movement estimation processing, processing of estimating whether the estimated movement is walking on a decline, walking on an incline, or running based on the first acceleration acquired at the first timing.

5. The information processing device according to claim 4, wherein the processor executes, in the movement estimation processing, processing that determines that the user is running in the case of, for respective acceleration components of the first direction and the first traveling direction acquired, magnitudes of the respective acceleration components being at least an acceleration threshold for running determination, and a pitch, which shows a time interval between peaks of each of the accelerations, being no more than a threshold for running determination; and that determines that the user is walking in the case of the magnitudes of the respective acceleration components being less than the acceleration threshold for running determination, or the pitch, which shows a time interval between peaks of each of the accelerations, being less than the threshold for running determination.

6. The information processing device according to claim 3, wherein the processor executes, in the first traveling direction estimation processing: filtering processing of letting through a first frequency band for a horizontal component of the acceleration being acquired if the movement estimated by the movement estimation processing based on the acceleration being acquired is walking, and of letting through a second frequency band which is higher than the first frequency band for the horizontal component of the acceleration being acquired if the movement estimated is running; and in the first traveling direction acquisition processing, processing of acquiring the first traveling direction, for each movement estimated by the movement estimation processing, based on the first direction being acquired and the acceleration being subjected to the filtering processing, by different traveling direction estimation methods.

7. The information processing device according to claim 6, wherein the processor executes, in the first traveling direction acquisition processing: in the case of the movement estimation processing determining walking on a decline, processing of estimating as being forward the direction of a peak of the horizontal component of the acceleration data nearest in a future direction on the time axis, or the second nearest in the past direction on the time axis, relative to a timing at which the first direction indicates an upward peak; and, in the case of the movement estimation processing determining not walking on a decline, processing of estimating as being forward the direction of a peak of the horizontal component of the acceleration data the second nearest in the future direction on the time axis, or nearest in the past direction on the time axis, relative to a timing at which the first direction indicates the upward peak.

8. The information processing device according to claim 6, wherein the processor executes, in the first traveling direction acquisition processing, in the case of the movement estimation processing determining running, processing of estimating as being forward the direction of a peak of the horizontal component of the acceleration belonging to a time period of the same half-cycle, relative to a timing at which the first direction indicates an upward peak.

9. The information processing device according to claim 1, wherein the processor executes, in the first direction acquisition processing, processing of acquiring an average value of components of the acceleration acquired within a preset time frame as the first direction.

10. The information processing device according to claim 1, wherein the processor executes, in the second direction acquisition processing, processing of acquiring an average value of components of the acceleration data acquired within a preset time frame as the second direction.

11. The information processing device according to claim 1, wherein the processor, under control of the program, further executes average traveling direction estimation processing of projecting a vector indicating the second traveling direction onto a horizontal plane defined by the second direction, and, on the horizontal plane, estimating an averaged traveling direction based on a plurality of vectors of acceleration within a set angle from a direction of the vector indicating the second traveling direction.

12. The information processing device according to claim 11, wherein the processor, under control of the program, further executes offset acquisition processing of, in the case of at least a predetermined difference existing for at least a threshold period of time between a direction of the vector indicating the second traveling direction projected onto the horizontal plane defined by the second direction and the averaged traveling direction, acquiring the difference as an offset for the traveling direction.

13. The information processing device according to claim 12, wherein the processor executes, in the average traveling direction estimation processing, processing of offsetting the traveling direction by adding the difference acquired by the offset acquisition processing to the averaged traveling direction.

14. The information processing device according to claim 1, wherein the sensor comprises an acceleration sensor.

15. An information processing device comprising:
a sensor; and
a hardware processor which, under control of a program stored in a memory, executes processing comprising:
determination processing of determining whether or not a preset condition for acquiring a first traveling direction is satisfied;
first direction acquisition processing of acquiring, based on an output of the sensor, a first acceleration applied to the information processing device, and acquiring a first direction based on the first acceleration, to which the information processing device is directed, when the preset condition is satisfied;
first traveling direction acquisition processing of acquiring the first traveling direction at a first timing, based on an acceleration component in a gravity direction of the first acceleration and an acceleration component in a direction perpendicular to the gravity direction of the first acceleration;
second direction acquisition processing of acquiring a second acceleration applied to the information processing device, and acquiring a second direction based on the second acceleration, to which the information processing device is directed, after the first traveling direction has been acquired; and
second traveling direction estimation processing of estimating a second traveling direction based on the second direction, the first direction, and the first traveling direction,
wherein the processor executes, in the determination processing, walking on a decline determination processing of determining walking on a decline, and processing of determining that a condition for stably estimating the first traveling direction is not satisfied if the walking on a decline determination processing determines walking on a decline, and
wherein the walking on a decline determination processing determines walking on a decline based on at least one of (i) detection of barometric pressure, (ii) reference to a gradient in stored map data, (iii) reference to a change in altitude acquired based on received GPS signals, and (iv) pattern matching performed between waveform models of acceleration.

16. The information processing device according to claim 15, further comprising an antenna by which the GPS signals are received,
wherein the sensor comprises an acceleration sensor and a barometric pressure sensor.

17. A traveling direction estimation method executed by a processor of an information processing device, the information processing device further comprising a sensor, and the method comprising:
determining whether or not a preset condition for acquiring a first traveling direction is satisfied;
acquiring, based on an output of the sensor, a first acceleration applied to the information processing device, and acquiring a first direction based on the first acceleration, to which the information processing device is directed, when the preset condition is satisfied;
acquiring the first traveling direction at a first timing based on an acceleration component in a gravity direction of the first acceleration and an acceleration component in a direction perpendicular to the gravity direction of the first acceleration;
acquiring a second acceleration applied to the information processing device, and acquiring a second direction based on the second acceleration, to which the information processing device is directed, after the first traveling direction has been acquired; and
estimating a second traveling direction based on the second direction, the first direction, and the first traveling direction,
wherein the determining includes determining that a condition for stably estimating the first traveling direction is not satisfied when one of (i) the first traveling direction being acquired reverses more frequently than a preset frequency, and (ii) a variation in the first direction being acquired is at least a preset angle.

18. A non-transitory storage medium that can be read and written to by a hardware processor of an information processing device, the information processing device further comprising a sensor, and the storage medium storing a program which is executable by the processor to control the processor to perform functions comprising:

determining whether or not a preset condition for acquiring a first traveling direction is satisfied;

acquiring, based on an output of the sensor, a first acceleration applied to the information processing device, and acquiring a first direction based on the first acceleration, to which the information processing device is directed, when the preset condition is satisfied;

acquiring the first traveling direction at a first timing, based on an acceleration component in a gravity direction of the first acceleration and an acceleration component in a direction perpendicular to the gravity direction of the first acceleration;

acquiring a second acceleration applied to the information processing device, and acquiring a second direction based on the second acceleration, to which the information processing device is directed, after the first traveling direction has been acquired; and estimating a second traveling direction based on the second direction, the first direction, and the first traveling direction, wherein determining includes walking on a decline determination processing of determining walking on a decline, and determining that a condition for stably estimating the first traveling direction is not satisfied if the walking on a decline determination processing determines walking on a decline, and wherein the walking on a decline determination processing determines walking on a decline based on at least one of (i) detection of barometric pressure, (ii) reference to a gradient in stored map data, (iii) reference to a change in altitude acquired based on received GPS signals, and (iv) pattern matching performed between waveform models of acceleration.

\* \* \* \* \*